July 28, 1942.  A. L. PARKER  2,290,890
TUBE COUPLING
Filed Nov. 22, 1940
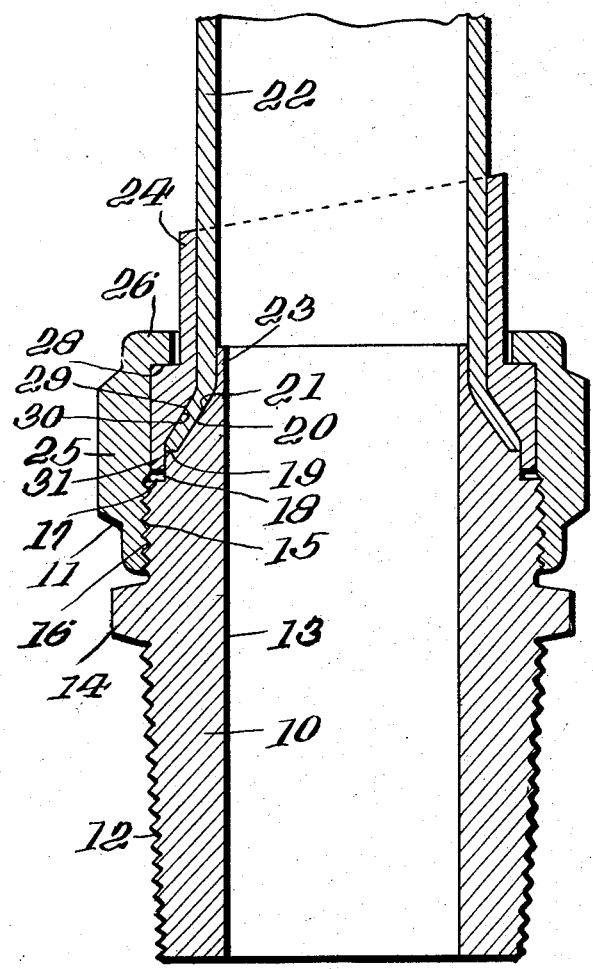
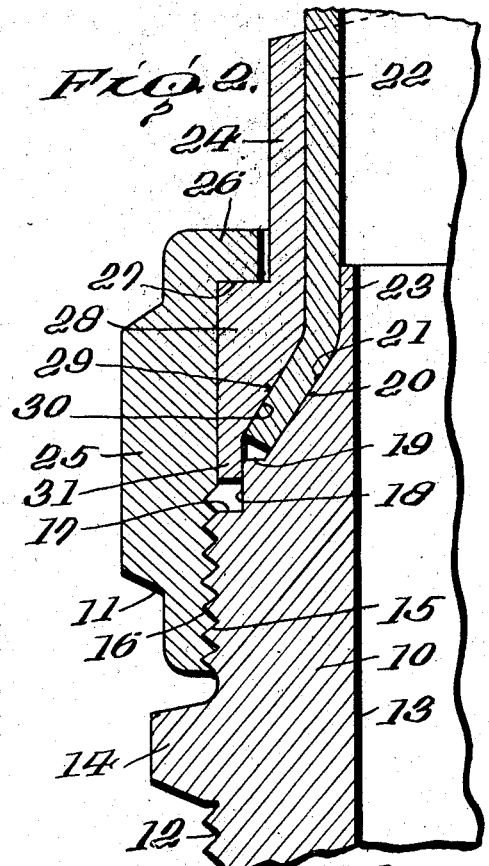
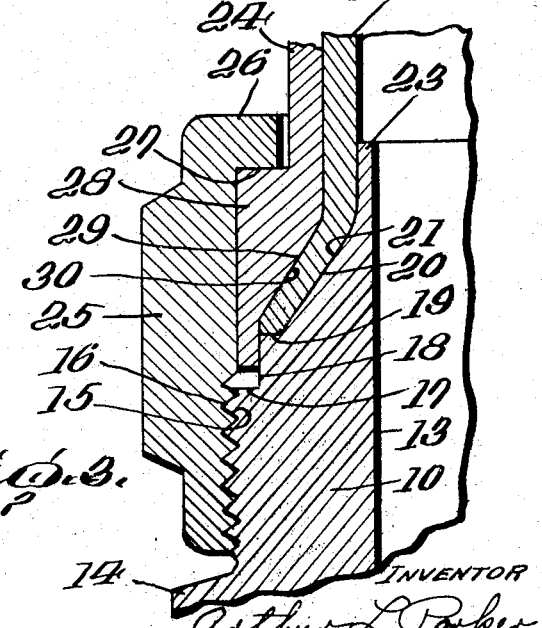
INVENTOR
Arthur L. Parker
By Mason & Porter
ATTORNEYS Patented July 28, 1942

2,290,890

UNITED STATES PATENT OFFICE 2,290,890

TUBE COUPLING

Arthur L. Parker, Cleveland, Ohio

Application November 22, 1940, Serial No. 366,737

4 Claims. (Cl. 285—86)

The present invention relates to new and useful improvements in tube or pipe couplings, and more particularly to improvements in couplings of the general type shown and described in the prior patents of Arthur L. Parker, Nos. 1,893,442 and 1,977,240, dated January 3, 1933, and October 16, 1933, respectively.

In general, the invention contemplates the provision of a coupling having a pair of coupling members which are adapted to clamp the flared end of a metal tube so as to provide a fluid tight joint. The metal of the tube is generally softer and more pliable than the metal of the coupling members which are preferably in the form of male and female coupling elements. The coupling members are provided with coniform surfaces for engaging and tightly clamping the adjacent surfaces of the flared end of the tube. When the coupling members are tightened relative to one another, the relatively soft tube is often caused to extrude at certain places with consequent disadvantages. Thus, where threaded coupling members are employed, the extreme edge of the flared end of the tube may be forced or extruded by the clamping action of the coupling members into engagement with the threads on one of the coupling members with the result that it becomes difficult to disengage the coupling. Then too, it has been found that the clamping of the flared end of the tube often results in an inward bulging of the body of the tube immediately adjacent the inner coupling member. The present invention is primarily concerned with the provision of a coupling which will overcome the above difficulties.

An object of the present invention is to provide a tube coupling of the above type wherein the coupling members are constructed and arranged so as to substantially confine the clamped end of the tube in order to limit extrusion thereof when the coupling members are tightened relative to one another.

Another object of the invention is to provide a coupling of the above type wherein the coupling members are constructed so as to provide a confining recess into which the extreme edge of the flared end of the tube may be forced during the clamping thereof so as to limit extrusion of the tube and also aid in providing a fluid tight joint.

A further object of the invention is to provide a tube coupling of the above type which is constructed and arranged so as to prevent the metal of the tube from being forced inwardly of the coupling members and into the fluid passage through the coupling.

A still further object of the invention is to provide a tube coupling of the above type which is relatively simple in construction and which effects tight clamping of the tube while preventing extrusion or thinning thereof in the clamped area.

The above and other objects of the invention will in part be obvious and will be hereinafter more fully pointed out.

In the accompanying drawing:

Figure 1 is a central longitudinal section showing the assembled coupling.

Figure 2 is an enlarged fragmentary longitudinal section showing the assembled position of the coupling parts before the tube is tightly clamped.

Figure 3 is a view similar to Figure 2 but showing the position of the coupling parts after the flared end of the tube has been tightly clamped.

Referring more in detail to the accompanying drawing, the coupling includes a pair of coupling elements which are illustrated as being in the form of male and female coupling members 10, 11 respectively. The male coupling member is provided with a threaded end 12 to which a conduit may be connected and with a central longitudinal bore 13 which provides a passage for the fluid. The male coupling member is also provided with a wrench engaging portion 14 and with an externally threaded surface 15 with which an internally threaded surface 16 on the female coupling member 11 is adapted to engage.

At one end of the threaded portion 15 on the male coupling member, there is provided an inwardly directed substantially radial shoulder portion 17 which terminates in an inwardly offset peripheral wall. This wall portion 18 is spaced inwardly from the adjacent inner surface of the female coupling 11 and terminates in a further inwardly directed radial surface 19. The surface 19 terminates in an inclined coniform seating surface 20 against which the inner surface 21 on the flared end of a tube 22 is adapted to be clamped. The inner portion of the male coupling member 10 is extended along the inner surface of the body of the tube 22 to provide an inner retaining skirt portion 23 which extends above the flared end of the tube.

The female coupling member 11 is illustrated as including an inner clamping sleeve portion 24 which extends along the outer surface of the body of the tube 22. The outer sleeve portion 11 of the female coupling is provided with a wrench engaging portion 25 and with an inwardly directed shoulder portion 26 which is adapted to engage an outwardly directed shoulder 27 on a head portion 28 at the inner end of the sleeve 24. The inner surface of the head portion 28 is provided with a coniform clamping surface 29 which is adapted to engage the outer surface 30 of the flared end of the tube 22 and this clamping surface 29 merges into a longitudinally extending skirt portion 31 on the inner sleeve 24.

When the various parts of the coupling have been initially assembled in the position shown in Figure 2, the skirt portion 31 on the sleeve 24 extends between the inner surface of the outer sleeve 11 and the longitudinally disposed wall portion 18. Thus, the inner surface of the skirt portion 31 and the wall portion 19 on the male coupling member provide a confining recess at the extreme edge of the flared end of the tube 22. Relative tightening of the coupling members along the connecting threads 15, 16 will effect relative longitudinal clamping movement of the coupling members. Thus, the shoulder 26 will effect similar movement of the inner sleeve 24 so that the flared end of the tube 22 will be tightly clamped between the clamping surfaces 20, 29 on the male and female coupling members, respectively. During this clamping movement, the metal of the flared end of the tube will be extruded or caused to flow into sealing engagement with the inner surface of the skirt portion 31 and the wall portion 19. Thus, the confining recess between the skirt portion 31 and the male coupling member will prevent extrusion of the flared end of the tube outwardly into engagement with the threads on the female coupling member. Similarly, the retaining skirt portion 23 on the male coupling member will serve to prevent the metal of the tube 22 above the flared end from being forced inwardly of the coupling into the path of the fluid flowing through the passage 13.

It is to be clearly understood that various types of tube coupling may be employed so long as the coupling is constructed in such a manner that extrusion of the tube is limited and prevented within said limits. From the foregoing description, it will be seen that the extreme edge of the tube is prevented from being forced outwardly into engagement with the outer sleeve of the female coupling so as to prevent interference with the threaded connection between the coupling members. Likewise, the tube is prevented from being extruded inwardly of the fluid passage immediately above the clamped flared end. By thus limiting and substantially preventing extrusion of the tube, excessive thinning of the tube in the clamped area is prevented. Thus, excessive pressures which may be applied by unskilled workmen in tightening the coupling will not result in objectionable thinning of the clamped area of the tube so that the desired strength of the coupling is maintained. With such a construction, the flared end of the tube can be placed under substantial pressure between the clamping surfaces without resulting in any objectionable thinning or weakening of the tube. The efficient operation of the coupling is thus maintained and the tube is effectively prevented from becoming unduly weakened in the clamped area.

While one form of the invention has been shown for purposes of illustration, it is to be clearly understood that various changes in the details of construction and arrangement of parts may be made without departing from the scope of the invention as set forth in the appended claims.

I claim:

1. A tube coupling for clamping the flared end of a tube, comprising relatively movable coupling members having coniform surfaces adapted to engage and clamp the inner and outer surfaces of the flared end of the tube, one of said coupling members having an extended sleeve portion overlapping and engaging the adjacent outer surface of another coupling member and said sleeve portion surrounding and extending beyond the flared end of the tube whereby to completely enclose the end of the tube and prevent extrusion thereof during initial assembly of the coupling and also during tightening of the coupling members relative to one another.

2. A tube coupling comprising a pair of coupling members capable of relative movement for clamping the flared end of a tube, said coupling members having coniform surfaces adapted to engage and clamp the inner and outer surfaces of the flared end of the tube, connecting means for joining said coupling members and effecting relative movement therebetween, one of said coupling members having an extended sleeve portion disposed within the connecting means and restrained thereby against outward movement and said sleeve portion overlapping the adjacent outer surface of the other coupling member and surrounding and extending beyond the flared end of the tube whereby to completely enclose the end of the tube and to prevent extrusion thereof during initial assembly of the coupling and also during tightening of the coupling members relative to one another.

3. A tube coupling for clamping the flared end of a tube, comprising a male coupling member, a female coupling member including inner and outer sleeve portions, means connecting the outer sleeve portion with said male coupling member, said inner sleeve portion and said male coupling member having coniform surfaces adapted to engage and clamp the inner and outer surfaces of the flared end of the tube, said male coupling member having an inwardly offset portion at the outer end of the coniform clamping surface, and said inner sleeve portion having a wall portion extended into said offset portion and overlying the male coupling member and enclosing the edge of the flared end of the tube whereby to prevent extrusion thereof against the outer sleeve portion during tightening of the coupling members relative to one another.

4. A tube coupling, as claimed in claim 3, wherein the male coupling member is provided with a wall portion extended within the body of the tube for preventing inward extrusion of the tube adjacent the clamped area thereof.

ARTHUR L. PARKER.